Jan. 27, 1959
T. B. HARPER
2,870,800
AUTOMATIC LIQUID DELIVERY SHUT-OFF DEVICE
Filed Dec. 6, 1957
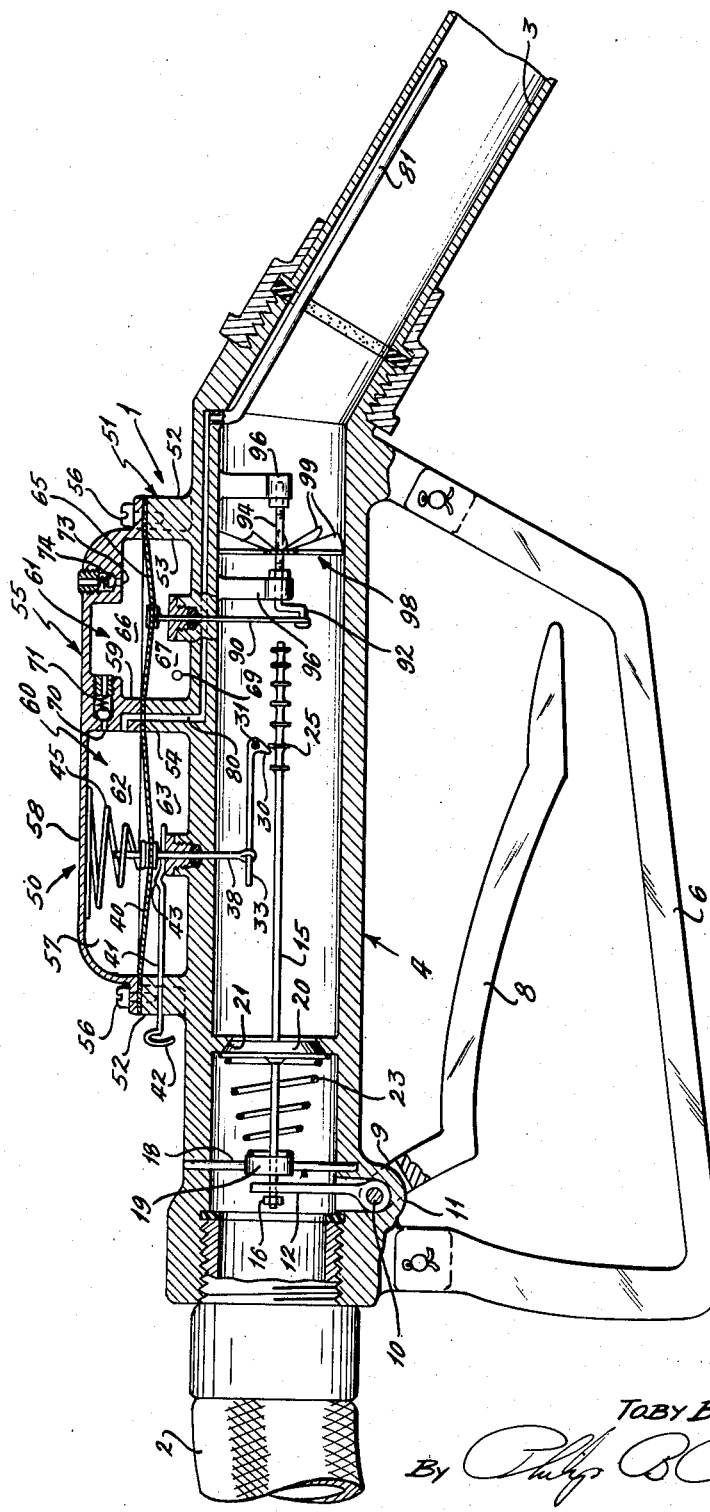
INVENTOR:
TOBY B. HARPER
By
ATTORNEY

2,870,800
AUTOMATIC LIQUID DELIVERY SHUT-OFF DEVICE

Toby B. Harper, Dolph, Ark.

Application December 6, 1957, Serial No. 701,134

2 Claims. (Cl. 141—209)

This invention relates to a device for shutting off the flow of liquids being delivered through a conduit or nozzle extending into a receptacle. It has particular, but by no means singular, application to gasoline pump delivery nozzles.

Until relatively recent times, the delivery nozzle of gasoline pumps at service stations was commonly equipped with a simple, manually operated valve which was biased toward its closed position, so that the attendant was required to keep it open manually until the desired amount of gasoline was delivered. In recent years, the delivery valve has been provided with a device for automatically shutting off the flow of gasoline through the nozzle, when the tank is full. The devices known heretofore for that purpose have had several disadvantages.

One of the objects of this invention is to provide a simple, positive, liquid delivery shut-off device.

Other objects will become apparent to those skilled in the art in the light of the following description and accompanying drawing.

In accordance with this invention, generally stated, the flow of liquid through a delivery nozzle is utilized to operate a fluid pump capable of producing a differential pressure sufficient to actuate a valve closing device. Means are provided for rendering the pressure differential provided by the fluid pump ineffective until the liquid level in the tank to be filled reaches a predetermined point. In the case of the flow of gasoline into a tank, the critical level will normally be the place at which the nozzle is covered.

In the drawing, Figure 1 is a fragmentary view, partly in section and partly broken away, of a gasoline pump hose and nozzle equipped with a cut-off device constructed in accordance with one embodiment of this invention.

Referring now to the drawing, reference numeral 1 indicates a gasoline pump nozzle attached to a hose 2, which is connected with a source of gasoline under pressure not here shown. The nozzle 1 is equipped with the usual open-ended spout 3, and a cylindrical body 4. A guard 6, on the body 4, serves to protect an operating lever 8 against accidental movement. The operating lever 8 is forked at one end, to provide two lugs 9, one of which is broken away in the drawing. The lugs 9 are rigidly connected to stub shafts 10, journalled in a boss 11 in the body 4.

The stub shafts 10 are secured to the base of a bifurcated yoke 12.

The yoke 12 embraces a shaft 15. The shaft 15 has a collar 16 on one end, against which the yoke 12 bears when the lever 8 is operated. The shaft 15 is slideably supported axially of the body 4 by a spider 18 with a supporting bearing block 19 at its center. The shaft 15 carries a valve 20 which seats in a valve seat 21 carried by the inside wall of the body 4. A spring 23 is compressed between the spider 18 and the valve 20, biasing the valve toward the valve seat 21. At the end of the shaft 15 opposite the collar 16, the shaft is provided with a series of annular teeth 25. The teeth 25 may be defined by annular grooves in the shaft 15, if the shaft 15 is of sufficient diameter. The teeth 25 form a ratchet section, and are adapted to be engaged by a pawl 30. The pawl 30 is pivoted on a chordally extending pin 31, and is provided with an operating lever arm 33. The operating lever arm 33 is rocked by a control rod 38 which passes through a packing gland in the wall of the body 4 and is connected at its outer end to a diaphram 40. A spring 45 biases the diaphram 40, hence the control rod 38 and operating lever 33 toward a position at which the pawl 30 engages the ratchet section at the end of the valve shaft 15. A manual control rod 41, provided with a handle part 42 on its outside end, has a lifter 43 on its inner end, and is arranged to be slid inwardly to raise the diaphram 40, hence the pawl 30 out of engagement with the teeth 25.

The diaphram 40 is mounted in a housing 50, which, in the embodiment shown, consists of a rectangular base 51, integral with the body 4, and a cover 55. The base 51 consists of a continuous side wall 53, with a boss 52 at each end, and a transverse partition 54.

The cover 55 is mounted on the base 51 by means of stud bolts 56 taking into the bosses 52. The cover 55 is constructed complementarily to the base 51, with a continuous side wall 57, a top 58, and a transverse partition 59 corresponding with the transverse partition 54. A gasket serves to seal the joint between the base and the cover.

The partitions 54 and 59 together define two separate chambers, a control chamber 60 and a pump chamber 61. The control chamber 60 is divided height-wise by the diaphram 40, into an upper control chamber 62 and a lower control chamber 63. The pump chamber 61 is divided by a pump diaphram 65 into an upper pump chamber 66 and a lower pump chamber 67.

The lower chambers 63 and 67 are vented to the atmosphere. The lower control chamber 63 is vented through a hole in the base side wall 53, which also serves to admit the manual control rod 41. The lower pump chamber 67 is vented through a hole 69 in the base side wall 53.

The upper control chamber 62 communicates with the upper pump chamber 66 through a passage 70 in which there is a check valve 71. The check valve 71, in the embodiment shown, contains a ball which seats to prevent the passage of fluid from the chamber 66 to the chamber 62, and unseats to permit the passage of fluid from the chamber 62 to the chamber 66. The upper pump chamber 66 communicates with the atmosphere through a port 73 in the top wall 58 of the cover 55. A check valve 74 in the passage 73 contains a ball which seats to prevent passage of fluid from the atmosphere to the interior of the chamber 66, but unseats to permit passage of fluid from the chamber 66 to the atmosphere. The upper control chamber 62 communicates with a passage 80 in the partitions 54 and 58, and the wall of the body 4. The passage 80 communicates with a tube 81 the open end of which extends to or near the open mouth of the spout 3.

A pump operating mechanism is provided, which, in the embodiment shown, consists of a connecting rod 90, passing through a packing gland in the wall of the body 4, and secured at one end to the diaphragm 65, and journaled at its other end on a crank 92. The crank 92 is at one end of a shaft 94, carried, axially of the body 4, by a pair of hangers 96. Securely mounted on the crank shaft 94, is an impeller 98. The impeller 98 is made in the usual construction of metering type impellers, with blades 99 so arranged as to insure the rotation of the impeller, hence the crank shaft, when any gasoline flows through the body 4.

In operation, assuming that the spout 3 has been placed within the confines of a container to be filled, that the operating lever 8 is in the position shown in Figure 1, and that the manual control rod 41 is pushed forward to the position at which the lift 43 is maintaining the diaphragm 40, hence the pawl 30, in inoperative position, the handle 42 of the control rod 41 is pulled to slide the lifter 43 to a position at which it no longer raises the diaphragm 40 against the bias of the spring 45, as shown in Figure 1. When this is done, the spring 45 moves the diaphragm 40 downwardly, rocking the pawl 30 counter-clockwise, as viewed in Figure 1, and putting it in ratchet engaging position as shown in that figure. If, now, the handle 8 is moved up manually, the yoke 12, bearing on the collar 16, lifts the valve 20 from the valve seat 21 and at the same time moves the teeth 25 under the pawl 30, which can rock clockwise to accommodate the passage of the teeth under it. If, then, the handle 8 is released, the shaft 15 can move only until the pawl 30 engages the side surface of the first tooth on the valve side of the pawl. Gasoline under pressure flows past the valve 20 through the seat 21, and, passing through the impeller blades 99, rotates the impeller 98. The rotation of the impeller 98 turns the crank 92 which reciprocates the connecting rod 90. On the upstroke of the connecting rod 90, the diaphragm 65 is moved upwardly into the upper pump chamber 66, displacing air which, because of the arrangement of the check valves 71 and 74, is exhausted to the atmosphere. On the return stroke, the diaphragm 65 moves out of the upper pump chamber 66, closing the check valve 74 and opening check valve 71, thus evacuating the chamber 66 and causing the air in the upper control chamber 62 to flow through the passage 70 into the upper pump chamber 66. The flow of air from the chamber 62 lowers the pressure in that chamber. However, as long the lower open end of the tube 81 remains uncovered, the air from the atmosphere flows through the passage 80 into the upper control chamber 62, equalizing the pressure on the two sides of the diaphragm 40 and permitting the bias of the spring 45 to maintain the pawl 30 in tooth-engaging position.

When, however, the lower end of the tube 81 is covered by the gasoline in the container, the pressure drop in the upper control chamber 62 is not nullified, and the diaphragm 40, responding to the atmospheric pressure in the lower chamber 63, moves upwardly against the bias of the spring 45, rocking the pawl 30 clockwise until it clears the top of the tooth with which it is engaged, permitting the valve 20, under the bias of the spring 23 and of the flowing gasoline, to seat in the valve seat 21, shutting off the flow of gasoline to the container.

It can be seen that the level of gasoline in the container can be controlled by the length of the tube 81. That tube can extend beyond the mouth of the spout 3, or, if it is so desired, can terminate short of the mouth of the nozzle. In the latter instance, it would be preferable to have the end of the pipe 81 extend through the wall of the spout, so that the gasoline in the nozzle does not block the end of the pipe 81 before the level of gasoline in the container has reached the end of the pipe.

It can be seen that numerous variations can be made in the construction of the various parts, without departing from the spirit of this invention. Thus, for example, the type of impellers, the kinds of check valves, the particular means for unseating the main valve 20 and for rendering the diaphragm 40 inoperative, can all be made quite different from those shown, somewhat diagrammatically, in the drawing. Different fluid pressure differential-producing means can be employed, and different valve retainer tripping devices. The diaphragms 40 and 65 can even be replaced by pistons operating in cylinders, although the diaphragms have certain advantages. Numerous other variations, within the scope of the claims, will occur to those skilled in the art in the light of the foregoing disclosure.

The term "nozzle" is used herein and in the claims to include any open ended conduit from which liquid is dispensed. The term "fluid pressure differential" is used to include both pressure and suction, although the use of suction has important advantages. The term "nullify" as applied to the fluid pressure differential equalizing effect of the venting of the chamber 62 is used to mean that the effectiveness of the fluid pressure differential is reduced below the point at which it can move the diaphragm 40 against the bias of the spring 45 to trip the pawl 30.

Having thus described the invention, what is claimed and desired to be secured by Letters Patent is:

1. A device for automatically cutting off the flow of liquid through a delivery nozzle when the liquid reaches a predetermined level in a container, comprising a hollow body through which the liquid flows to the nozzle, a valve in said body moveable between liquid flow permitting and liquid flow preventing positions, valve biasing means urging said valve to liquid flow preventing position, retaining means for maintaining said valve in liquid flow permitting position against the bias of said biasing means, and release means including a retaining means tripping device operated by a fluid pressure differential, a fluid pump operated by the flow of liquid through said body and connected and arranged to supply said fluid pressure differential, said fluid pump comprising a diaphragm reciprocated by a connecting rod operated by a crank shaft rotated by an impeller positioned in the hollow body, and fluid pressure differential inhibiting means operative while the level of the liquid in the container is below the predetermined point and inoperative when the level of the liquid in the container is above said predetermined point to nullify the said pressure differential 2. In a device for automatically shutting off the flow of liquid through a delivery nozzle when the level of liquid in a container being filled reaches a predetermined position, said device having a hollow body through which the liquid flows, a valve in said body movable between liquid flow permitting and liquid flow preventing position, and means responsive to a predetermined pressure differential for actuating the movement of said valve to liquid flow preventing position, the improvement comprising a fluid pump for producing said fluid pressure differential, a fluid pump operating impeller positioned to be rotated by the flow of liquid through the said body and mechanically connected to said fluid pump to operate said fluid pump when the impeller rotates, and means for rendering the pressure differential provided by the said fluid pump ineffective until the liquid level in the container to be filled reaches a predetermined point.

References Cited in the file of this patent

UNITED STATES PATENTS

| 2,309,503 | Frank | Jan. 26, 1943 |
| 2,528,697 | Logan et al. | Nov. 7, 1950 |